Oct. 19, 1926. 1,603,413
E. C. ROGERS
MOVING PICTURE MACHINE
Filed Oct. 27, 1922   4 Sheets-Sheet 1
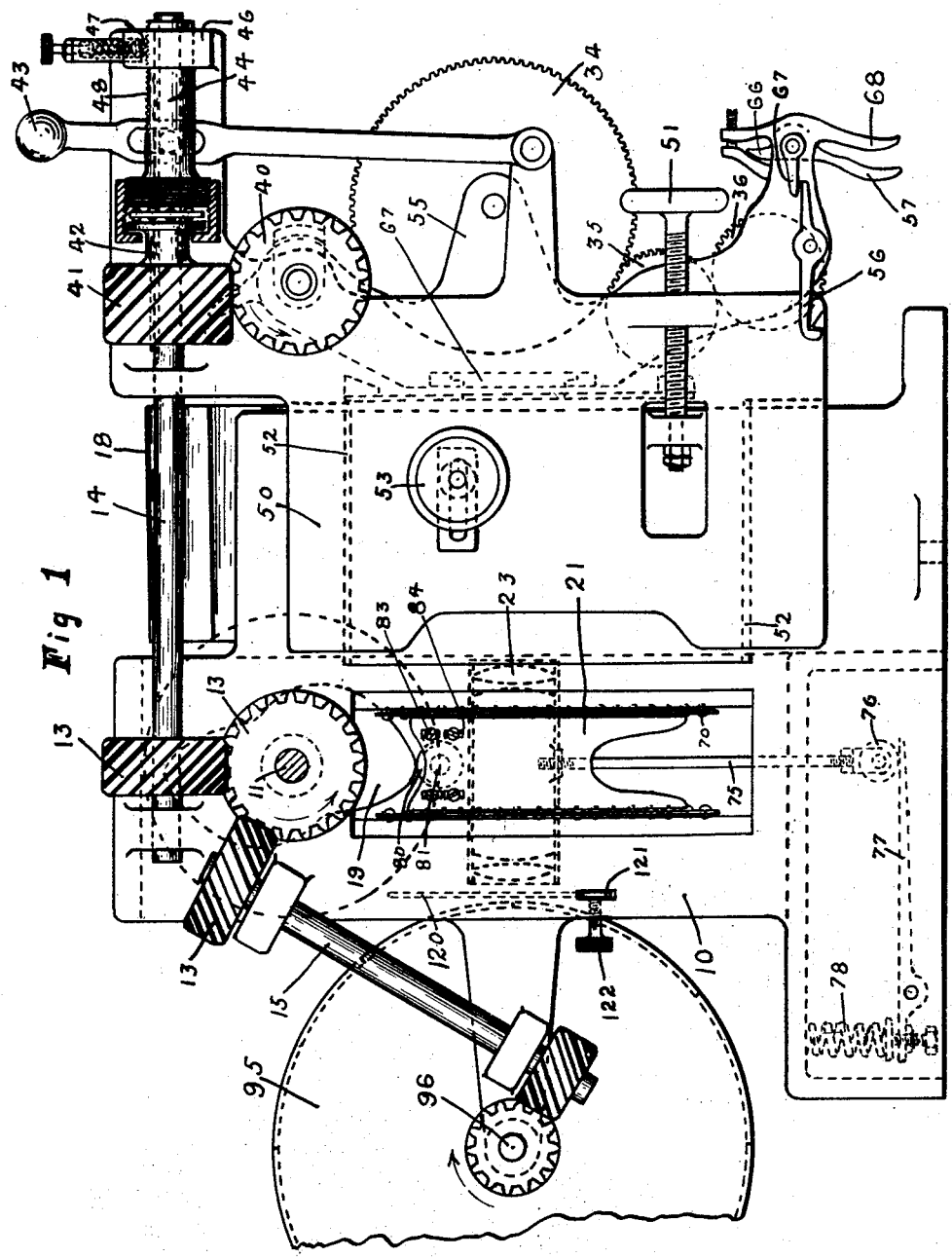
INVENTOR.
Elwood C. Rogers,
BY
ATTORNEY.

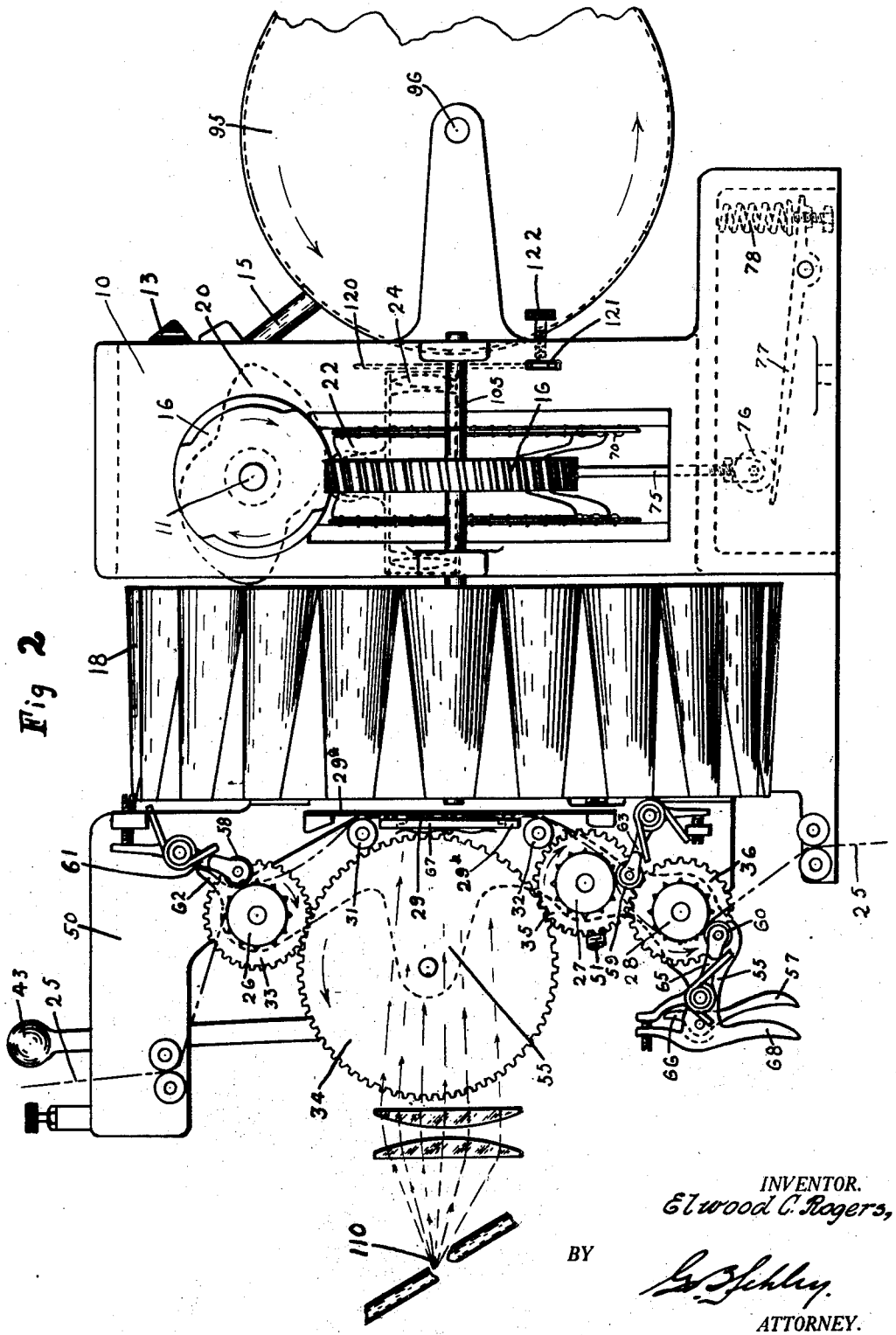

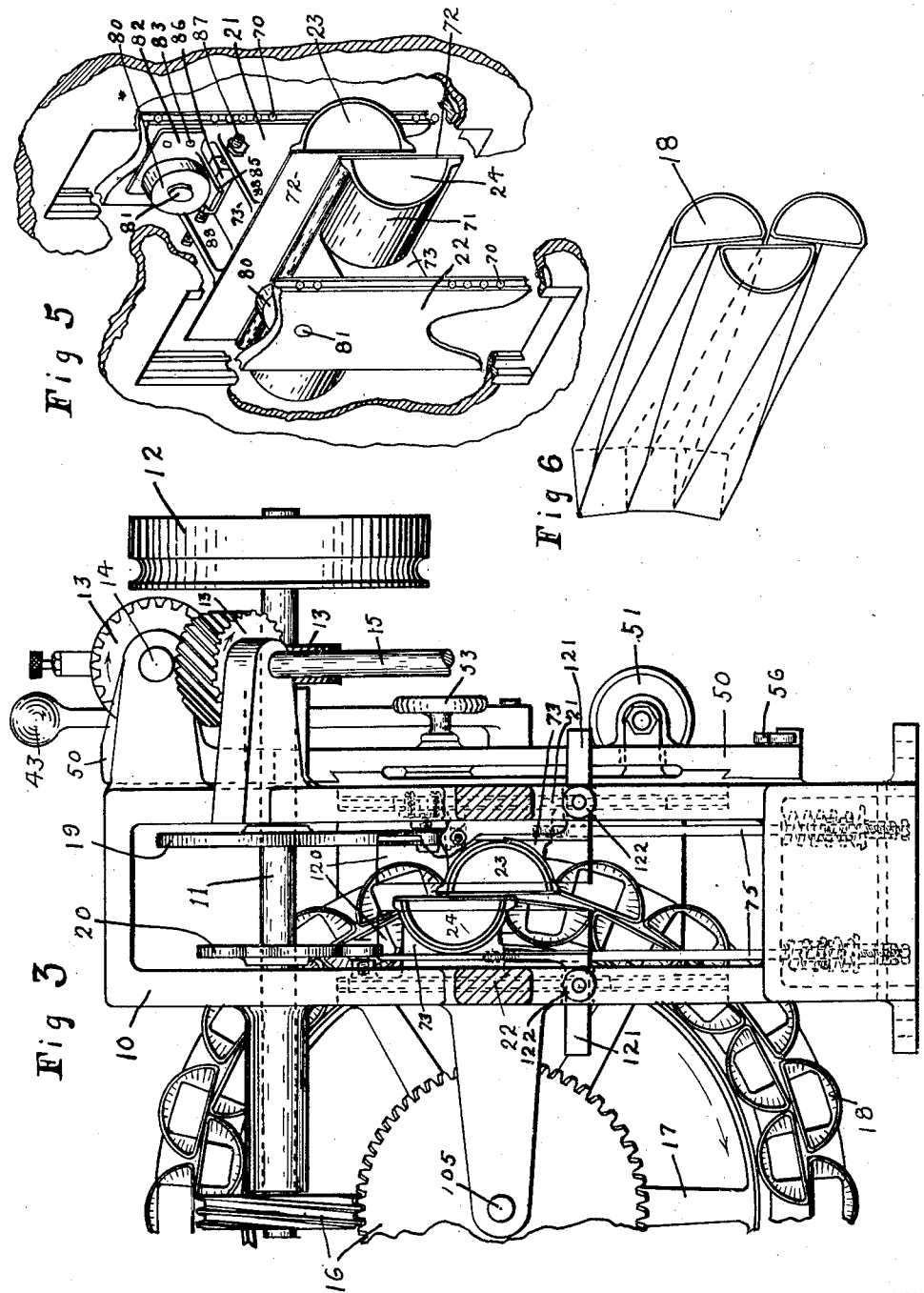

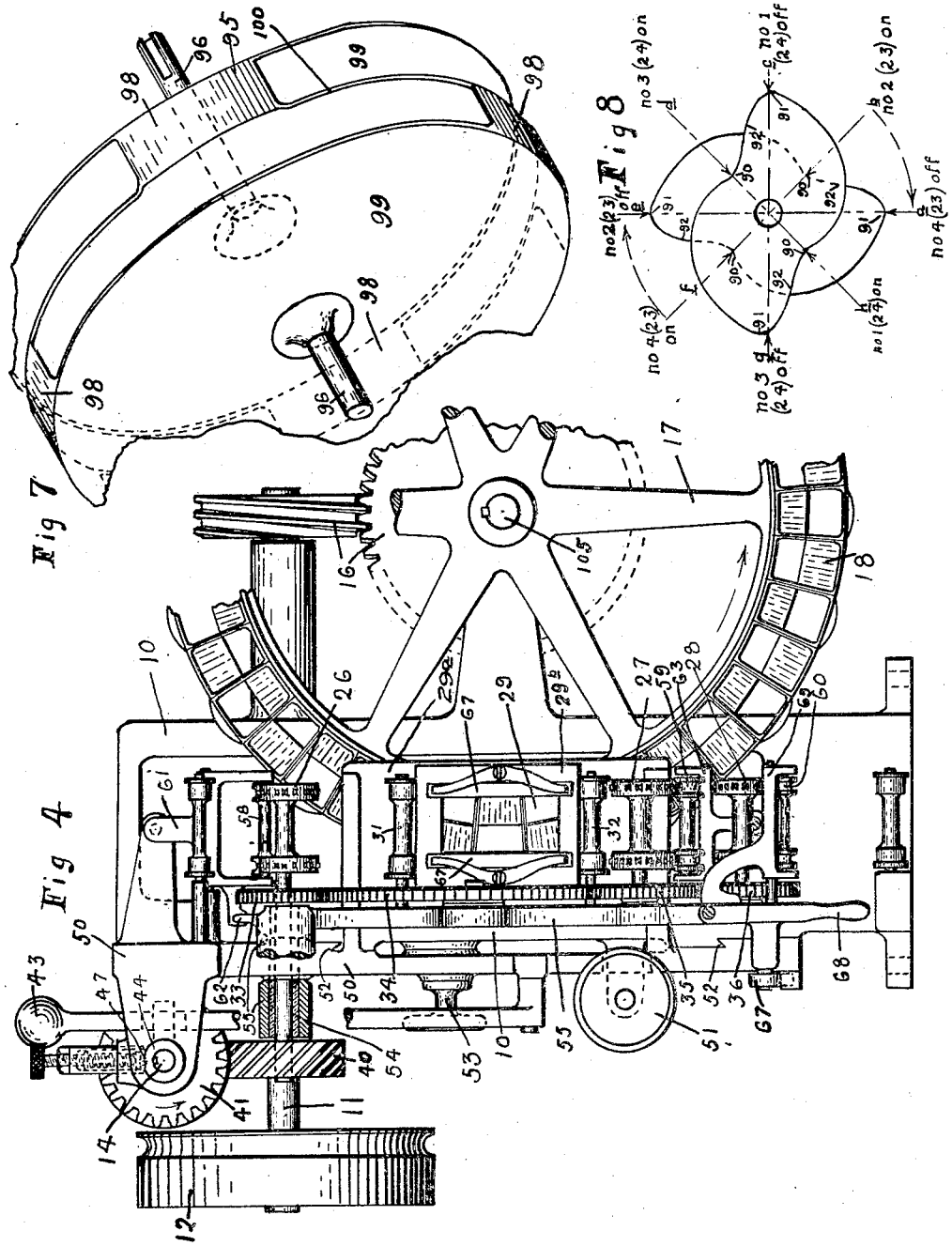

Patented Oct. 19, 1926.

1,603,413

UNITED STATES PATENT OFFICE.

ELWOOD C. ROGERS, OF INDIANAPOLIS, INDIANA.

MOVING-PICTURE MACHINE.

Application filed October 27, 1922. Serial No. 597,258.

It is the object of my invention to make a moving-picture machine which maintains the light constantly on the screen, maintains the film in uniform motion instead of the ordinary intermittent motion, dissolves from one picture of the film into the next by materially overlapping them in time on the screen, and can readily be used for producing colored pictures; so that both clearer and more pleasing effects on audiences may be obtained, the wear and tear on the film when it is being shown may be reduced, pictures may be run more slowly than is necessary when successive pictures on the screen are separated by an interval of darkness, and colored moving pictures may be produced by a simple arrangement. It is a further object to make a machine which is not only suitable for projecting moving pictures but also for use in a moving-picture camera, for taking the pictures; although I shall describe my invention primarily in its use for projecting pictures.

In carrying out my invention, I move the film uniformly past the source of light, ordinarily from the usual condensing lens; and in front of the moving film I provide an objective lens divided into a plurality of parts (to form individual lens systems) which are separately reciprocated parallel to the line of film movement, so that the lens-parts which move successively past a given point in the direction of film movement will travel in that direction substantially in unison with successive pictures of the film (though preferably slightly slower so that the picture on the screen will not be moved materially), and light transmitted through a plurality of such lens-parts and a plurality of successive pictures in the film will overlap in time upon the screen; and I shut off the light through each lens-part while it is moved backward (or against the direction of film movement) into position to co-operate with another picture of the film, which backward movement is preferably made more rapid than the forward movement. Preferably I provide cams for moving the several lens-parts, to give them a uniform movement with the film and a quick return movement to co-operative relation with another picture, so that each lens-part is transmitting a picture for more than half the time. Further, I provide suitable shutters and light-confining tubes for preventing interference between pictures which overlap in time upon the screen. In addition, I provide a novel film carrier, for making it possible to place the film in the machine quickly, and for giving access to the various parts without disturbing other parts; and I provide novel positioning arrangements for insuring registering of successive pictures on the screen and for locating the picture properly on the screen. By having the pictures in the film arrangement in cycles, with the different pictures of a cycle having different color values, my machine very effectively produces colored pictures, whereby by the use of two or three colors there is true natural coloring in the pictures part of the time and the effect of true natural coloring during the rest of the time is obtained by persistence of vision.

The accompanying drawings illustrate my invention: Fig. 1 is a side elevation of a moving-picture machine embodying my invention, viewed from the left, with some parts broken away or in section; Fig. 2 is a side elevation of the same machine, viewed from the right; Fig. 3 is a front elevation, and Fig. 4 a rear elevation, of such machine, with some parts broken away and in section; Fig. 5 is a fragmentary perspective detail of the carrying slides for the lens-parts, showing the adjusting mechanism for producing registry on the screen between pictures carried by the several lens-parts; Fig. 6 is a perspective detail view of a group of light-confining tubes, to show their interrelation; Fig. 7 is a perspective view of the shutter; and Fig. 8 is a side elevation of the actuating cams for shifting the lens-parts, combined with a diagram showing the relation of the light and dark periods of the several lens-parts.

I have shown my invention in its simpler form, in which the objective lens is divided into only two lens-parts, and two successive pictures on a film make a complete cycle of lens movement and operation; but it is obvious that my invention is not limited to the division of the objective lens into only two parts, or to the use of only two successive pictures of a film for such a cycle.

In my machine, there is a main frame 10, which near its forward end and near the top has a main transverse drive shaft 11, from which power for moving the various parts is obtained. This drive shaft 11 may be driven in any suitable manner, by hand or power as desired; and is shown as having a driving pulley and fly-wheel 12 which may be connected by any suitable belt to a source of power. This main driving shaft 11 is drivingly connected, preferably by spiral gearing 13, to a horizontal film-moving shaft 14 extending to the rear, and to an oblique shutter-moving shaft 15 extending obliquely downward toward the front; and is connected by worm gearing 16 to the wheel 17 which carries the circular series of light-confining tubes 18; and it carries two cams 19 and 20 which separately shift two parallel slides 21 and 22 which carry the two lens-parts 23 and 24 into which, in the form of invention here illustrated, I have divided the objective lens.

The film 25 is fed from the usual upper feed reel (not shown) over three film-sprockets 26, 27, and 28, of which the first is above and the last two below the film gate 29 through which the film travels and in which the pictures at any moment being projected are located. The film-gate has the usual guide rollers 31 and 32 above and below it, for guiding the film in a straight line as it passes through the film-gate. A gear 33 on the shaft of the film sprocket 26 is connected by an idler gear 34 to a gear 35 on the shaft of the film sprocket 27, and the gear 35 meshes with a gear 36 on the shaft of the film sprocket 28, so that the film sprockets 26 and 27 rotate in the same direction, and the film sprocket 28 rotates in the opposite direction, as the film 25 passes in the opposite direction around the film-sprocket 28 from what it does around the other two film sprockets. The film sprockets 26, 27, and 28 are all preferably the same size, in which case the gears 33, 35, and 36 are likewise all the same size in order that the linear rate of film movement over the several film sprockets may be uniform.

These film sprockets are all driven at a uniform rate, instead of intermittently, so that the film 25 moves at a uniform and constant speed through the film gate 29. For this purpose, the shaft of the film sprocket 26 has a spiral gear 40 which meshes with a spiral gear 41 on a sleeve 42 splined on the film-moving shaft 14. This not only provides a uniform drive for various film sprockets, through the spiral gearing 41—40 and the gearing 33—34—35—36, but also provides a convenient means for framing a picture by shifting the sleeve 42 longitudinally of the film-moving shaft 14 relatively to the film sprocket 26 and gear 40; for because the gears 40 and 41 are spiral gears, a longitudinal movement of the sleeve 42 causes a turning movement of the gear 40 about its axis, and therefore a turning of all of the film sprockets by reason of their interconnecting gearing. This shifting of the sleeve 42 is obtained by a shifting lever 43, which is the framing lever. The framing lever shifts longitudinally a sliding sleeve 44, shown as surrounding the end of the film-moving shaft 14 but free therefrom, which sleeve has an anti-friction thrust-bearing connection 45 with the sleeve 42, as is clear from Fig. 1. The sleeve 44 is in part supported on the film-moving shaft 14, and in part serves as a bearing therefor; and it is slidable in a lug 46 in the upper part of which is a spring-pressed ball 47 co-operating with notches 48 in the sleeve 44 to hold such sleeve in adjusted position.

The film gate 29, the various film sprockets, the sleeve 44 and its positioning lug 46, the framing lever 43, and preferably one bearing 49 for the film-moving shaft 14, are all supported by a sub-frame 50, which is carried by the main frame 10 but is slidable longitudinally thereof by an adjusting screw 51 for focusing purposes. In other words, for focusing I move the whole film and its associated parts on the main frame, instead of focusing by adjustment on the main frame of the objective lens. The sub-frame 50 is mounted on the left side of the main frame 10 in suitable slideways 52, as is clear from Figs. 1 and 4; and when it has been adjusted to the desired position by the adjusting screw 51 it may be clamped in that position by a clamping screw 53 extending through a slot in the sub-frame 50 into the main frame 10. By the adjustment of the sub-frame 50 upon turning of the screw 51, the spiral gear 41 is moved longitudinally of the film-moving shaft 14, by the same amount as is the spiral gear 40; for the lug 46 is part of the sub-frame 50, and by the co-action of the spring-pressed ball 47 with the notches 48 the sleeve 44 and therefore the sleeve 42 are moved with the sub-frame 50. In consequence, such adjustment of the sub-frame 50 produces no relative movement between the spiral gears 40 and 41, and therefore does not disturb the framing of the picture.

The shafts of the gears 34, 35, and 36, and so of the film sprockets 27 and 28, are directly carried by a swinging arm 55 substantially at the rear end of the machine. This arm 55 is suitably pivoted to the sub-frame 50 on the common axis of the film sprocket 26 and gear 33, as by being mounted on the outside of the two projecting ends of a bushing 54 which has its middle part mounted in the sub-frame 50 and furnishes a bearing within it for the shaft of the film sprocket 26 and gear 33. This swinging arm 55 is swung down to the position shown in Figs. 1 and 2 when the machine is in operation, and is held in such position by a releasable latch 56 (see Fig. 1), which latch may be released by a trigger 57 to permit the arm 55 to be swung upward (clockwise in Fig. 2 or counter-clockwise in Fig. 1) about its supporting pivot-shaft. This is to make more convenient the association and the dissociation of the film with the machine. For this purpose, the film gate 29 is divided into a front part 29$^a$ and a rear part 29$^b$; and the front part 29$^a$ is carried directly by the sub-frame 50, while the rear part 29$^b$ is carried by the swinging arm 55, so that by the swinging upward of such arm the two parts 29$^a$ and 29$^b$ of the film gate are widely separated to allow the easy insertion of the film edgewise between them, instead of requiring that the film be threaded through the film gate or inserted through a narrow opening. The guide rollers 31 and 32 above and below the film gate are also carried by the swinging arm 50, and are separated from the front part 29$^a$ of the film gate by the swinging upward of said swinging arm. Further, the film sprockets 26, 27, and 28 have associated with them spring-pressed rollers 58, 59, and 60 respectively, for holding the film firmly in contact with said sprockets; and all these rollers are arranged to be separated from their associated film sprockets when the swinging arm 55 is swung up. To this end the roller 58 is carried by a spring-pressed lever 61 supported on the sub-frame 50, and a finger 62 on the upper end of the swinging arm 55 is arranged to engage this lever 61 to move it and the roller 58 against the pressure of their actuating spring upon the swinging upward of the arm 55; the roller 59 is carried by a spring-pressed bell-crank 63 supported directly on the sub-frame 50, so that when the arm 55 and the film sprocket 27 is carried up with it the roller 59 is left behind and is thus separated from its associated film sprocket; and the roller 60 is carried by a spring-pressed bell-crank 65 which is carried by the swinging arm 55 and which cooperates with one releasing finger 66 of the trigger 57 so that when such trigger is pulled the action of the finger 66 is to separate the roller 60 from the film sprocket 28. The releasing finger 66 is but one of two releasing fingers of the trigger 57, the other finger 67 co-operating with the latch 56 as is clear from Fig. 1. The trigger 57 is preferably associated with a thumb-piece 68, so that the operator grasps the thumb-piece 68 and trigger 57 between his thumb and forefinger and swings the arm upward when it is desired to associate the film with the machine or dissociate it therefrom; for with the arm 55 thus swung upward, a film may easily be inserted into its proper position sidewise, thus producing a material saving in time (as in case a film breaks) over what is required when the film has to be threaded through the various parts over which it runs.

The rear part 29$^b$ of the film gate 29 preferably has two vertical forwardly spring-pressed flanged bars 69 which are set in suitably shaped slots in such rear part 29$^b$ and press forward against the rear face and near the edge of the film passing through the film gate.

The slides 21 and 22 which carry the two lens-parts 23 and 24 of the objective lens are vertically slidable in the main frame 10, preferably on ball-bearings provided by balls 70 carried by suitable cages and cooperating with suitable grooves in the main frame 10 and the slides 21 and 22. The two lens-parts 23 and 24 are really parts of one objective lens, so that when in their movement they come opposite each other they have the same optical axis. This objective lens is any suitable objective lens, usually made of several associated lenses in series for getting the desired optical effects; and this entire series of lenses forming the objective lens is divided into the desired number of lens-parts, here shown as two, on planes of division which are substantially parallel to the line of film movement but perpendicular to the film itself as it passes through the film gate. Each lens-part extends axially the whole length of the lens and is a complete lens system. Each lens-part is mounted in a tube 71 conforming to the contour of such lens-part, or semi-cylindrical when there are only two lens-parts; which tubes may include suitable vertical opaque plates 72 to ensure that there will be no interference between the pictures being transmitted at any moment through the several lens-parts. Each of these tubes 71 is suitably carried by a projecting arm 73 from its carrying slide 21 or 22.

Each slide 21 and 22 with its associated lens-parts is spring-pressed upward. To this end each slide is provided with a downwardly projecting rod 75, shown as projecting downward from the arm 73 for the sake of balance, which rod 75 at the bottom is provided with a roller 76 resting on one end of a lever 77 suitably pivoted in the base of the frame 10 and having its other arm pushed downwardly by a compression spring 78. Each lens-part has its own spring 78, so that there are as many such springs as there are lens-parts. Thus each slide is pushed upward by its associated spring 78 but is positively pushed downward against the action of such spring by its associated cam 19 or 20; there are as many cams as lens-parts.

Each cam 19 or 20 acts on its associated slide 21 or 22 through a roller 80 carried by the upper part of such slide and preferably arranged in the common vertical line not only of the actuating cam 19 or 20 but of the associated rod 78, so that there will be no tendency to tilt the lens-part. The roller 80 for one of the slides, here the slide 22, may be mounted on a pivot pin 81 fixed on said slide. For the other slide or slides, however, the roller 80 is vertically adjustable, to provide an adjusting means whereby registry on the screen of the pictures transmitted through the several lens-parts may be obtained. To that end, the roller 80 for the slide 21 is carried by an adjustable bracket 82, which is provided with clamping screws 83 extending through vertical slots 84 in the slide 21. While this permits the adjustment, I preferably provide a micrometer adjusting device for obtaining relative movements between the slide 21 and bracket 82, as the adjustment must be very fine. For this purpose I provide the bracket 82 with a finger 85 below the roller 80, with which finger co-operates a movable wedge 86 carried by a screw 87 extending between two parallel fins 88 projecting upward from the arm 73, as is clear from Fig. 5. By loosening the screws 83 and manipulating the screw 87, the relation between the bracket 82 and slide 81 may be adjusted very accurately; and when the desired adjustment is obtained the clamping screws 83 are tightened.

The cams 19 and 20 are all alike, and are preferably arranged so that one revolution of the cam corresponds to a plurality of cycles of pictures; as shown, each cam is provided with two lobes, so that each cam makes a complete revolution for two cycles of pictures. The lobes of the several cams follow one another past a given point in the same period of time that one picture of the film follows another; so that successive cams are displaced from one another on the shaft by angles which are equal to 360° divided by the product of the number of lens-parts and the number of lobes per cam; with two lobes per cam, and two lens-parts, the lobes of the two cams 19 and 20 are displaced from one another by 90°.

The inter-relationship of the cams is clear from Fig. 8, which shows the cams as viewed from the right-hand side of the machine, or from the same side as Fig. 2 is viewed. Each lobe of each cam has a total extent of 180° when each cam has two lobes as shown, and extends from one low-point or valley 90 to an opposite one, with an intermediate high-point or peak 91 between the two valleys. The peak 91, however, is not midway the two valleys between which it lies, but is much nearer the valley in the counter-clockwise direction therefrom than it is to the valley in the clockwise direction therefrom (Fig. 8). Thus there is a steep slope 92 on each cam between each peak or high-point 91 and the adjacent low-point and valley 90 in the counter-clockwise direction. As the cams are rotated in a clockwise direction this steep slope 92 permits a quick rise (by the action of the spring 78) of the associated slide (21 or 22) and lens-part (23 or 24) from their lowermost point, at which they have completed their co-operation with one picture of the film, to their highest point, at which they come into co-operative relation with another picture of the film. On the other or clockwise side of each high-point 91 is a more gradual slope 93, which connects such high-point with the adjacent low-point 90 in the clockwise direction therefrom. As the cam is moved in a clockwise direction, this gradual slope 93 co-operates with the roller 80 to force the associated slide and lens-part positively downward against the action of the spring 78.

The slope 93 is a spiral curve so designed that it will give a uniform speed of travel to the associated slide 21 or 22, at substantially the same rate as the film is traveling so that a lens-part will move downward in unison with a picture on the film. For exact work the slope 93 is designed to move the associated lens-part at a very slightly less rate of speed than the associated picture moves, but at a proportionate speed so that there will be no movement of the picture on the screen. The slope 93 extends for about 135° on the cam shown; so that since the period of time between the passing of successive pictures of the film past a given point corresponds to 90° of cam movement, each lens-part is traveling with and transmitting any given picture for much more than the time interval from one picture to the next, relative to their passage past a given point in the film-gate, or for about one and one-half (1½) times said time interval with the cams shown. Thus one picture comes onto the screen through one lens-part before the preceding picture through the other lens-part has been taken off the screen; and during part of the time each picture is on the screen the other lens-part is being moved from co-operative relation with a preceding picture upward into co-operative relation with a succeeding picture.

This is clear from Fig. 8, which shows this overlapping of pictures: Starting with the vertical line $a$ in this figure, the cam 19 has forced the roller 80 of the lens-part 23 downward as far as it will go, but the cam 24 has forced downward the roller 80 of the lens-part 24 through only about one-third of its downward movement. The lens-part 24 at this time is transmitting a picture, which may be called picture No. 1 and which came onto the screen 45° ahead in the cam movement, or when the line $h$ was vertical. As the cams rotate, the successive lines $a$, $b$, $c$, $d$, $e$, $f$, $g$, and $h$, pass successively through the vertical position. Between the lines $a$ and $b$, the steep slope 92 of the cam 19 permits the lens-part 23 to be moved quickly upward into co-operation with picture No. 1

2, which comes onto the screen when the line *b* becomes vertical. Picture No. 1 and lens-part 24 have in the meantime moved farther downward; and will continue to do so until the line *c* becomes vertical in the clockwise movement of the cams. During the interval between lines *b* and *c*, both picture No. 1 and picture No. 2 are being displayed on the screen. At line *c*, picture No. 1 is taken off, as the lens-part 24 has then reached the bottom of its movement. Between the lines *c* and *d* the lens-part 24 is moved upward, to come into co-operation with picture No. 3 when the line *d* becomes vertical; but during this time the picture through the lens-part 23 is being displayed on the screen, and will continue to be so displayed until the line *e* becomes vertical.

It is unnecesary to trace this all the way through, as it is evident from Fig. 8 that picture No. 1 remains on the screen from the line *h* to the line *c*, picture No. 2 from the line *b* to the line *e*, picture No. 3 from the line *d* to the line *g*, and picture No. 4 from the line *f* to the line *a*, so that there are two pictures superposed on the screen between the lines *h* and *a*, *b* and *c*, *d* and *e*, and *f* and *g*, but only one between the lines *a* and *b*, *c* and *d*, *e* and *f*, and *g* and *h*. Thus picture No. 1 is dissolved into picture No. 2 by their overlapping in time on the screen; in the same way, each picture is dissolved into the succeeding picture of the film.

Because of this overlapping of pictures on the screen and the elimination of intervals of darkness between pictures, several advantages are obtained. In the first place, the average light on the screen is increased. In the second place, the dissolving of one picture into the next produces a blending between successive pictures which is easier on the eye and more pleasing than when there are intervals of darkness between successive pictures. In the third place, this blending is independent of the limits of persistence of vision, so that in addition to the increased æsthetic value of the pictures thus exhibited it is possible to exhibit pictures at a less rapid rate of change without producing the effect of a series of separate pictures. In the fourth place, color pictures may be shown pleasantly at a speed which is no greater and may even be less than the now usual rate, instead of being required to be shown at a much higher rate of speed to avoid the impression of separate differently colored pictures, as must be done with certain other processes for producing color pictures from uncolored films.

In order to shut off the light through each lens-part while it is being permitted to move upward by a steep slope 92 of its operating cam, I provide a rotating shutter 95 in front of the objective lens. This shutter is carried by transverse trunnions 96 one of which has a driving connection with the shutter-moving shaft 15, as by spiral gearing 97. The shutter is carried by trunnions rather than by a shaft, so that there will be no shaft projecting through to interfere with the passage of the light. Said shutter has a plurality of sets of arc-shaped opaque plates 98, one set for each lens-part, so that there are two sets in the arrangement shown; and in the arrangement shown there are two opposite plates 98 in each set. As the shutter is rotated, the two plates of a set co-operate with one lens-part to shut off the light from that lens-part during the time such lens-part is being moved upward by the action of the associated steep slope 92 of its actuating cam, but the spaces between such plates permit the light from each lens-part to pass to the screen during the time that lens-part is being moved downward by the gradual slope 93 of its actuating cam. The plates 98 shut off the light simultaneously from top and bottom, as one plate 98 is moving upward while the opposite plate 98 is moving downward in front of the lens-part; and light (from a new picture) from the lens-part is allowed to pass to the screen by opening a passage first midway in the height of the lens-part and increasing the opening both upward and downward therefrom. The different sets of plates 98 are suitably spaced with relation to each other to shut off the light in proper sequence for the several lens-parts while they are respectively changing their association from one film picture to another; as shown, this spaces the plates 98 of the entire group 90° apart, circumferentially, which is the same spacing as that between adjacent high points 91 of the entire group of cams; though this identity of spacing is merely incidental to the particular gearings shown, and is not essential. The several opaque plates 98 of the shutter are supported by suitable end plates 99, and the several sets are preferably separated by very narrow dividing strips 100.

In order to prevent interference between the pictures being transmitted by the different lens-parts as the light for such pictures passes from the film to the lens-parts, I provide between the film gate 29 and the objective lens a circular series of light-confining tubes 18, a group of which tubes is shown in Fig. 6. These tubes are carried on the periphery of the wheel 17, the shaft 105 of which is offset laterally from the vertical plane of light-transmission through the machine and extends parallel thereto. Such tube is driven by the worm gearing 16 from the main drive shaft 11. The light-confining tubes 18 are nearly rectangular at their rear ends, and correspond in size, shape, and spacing very closely to the picture of the film so that successive pictures will register with the rear ends of successive light-confining tubes as the film travels downward and the wheel 17 is rotated. The rear ends of these tubes form a single circular series, arranged on a single circle. The forward ends, however, are not in a single circular series, but are staggered of offset radially of the wheel 17 relatively to one another so that successive tubes of a group of tubes equal to the number of lens-parts of the objective lens will register respectively with the several lens-parts; as shown, the forward ends of the light-confining tubes are substantially semi-circular in cross-section, as is clear from Fig. 6, so that as the wheel 17 is rotated one set of alternate tubes will co-operate with one lens-part and the other set of alternate tubes will co-operate with the other lens-part, with each lens-part during its downward movement co-operating with and substantially registering with the forward end of one of the light-confining tubes. In this way, the light which passes through one picture of the film is confined to its own lens-part and is not allowed to reach the other lens-part or lens-parts, so that each lens-part at any particular time will have light from only one picture of the film.

When color effects are desired, they may readily be obtained with an uncolored film having different color values for the pictures of each cycle, (the number of pictures in a cycle corresponding to the number of lens-parts,) by providing color filters of different colors for the several lens-parts. When there are only two lens-parts, there will be two such color filters 120, as is shown in Fig. 3, one co-operating with each lens-part, and the two color filters being of complementary colors, such as red and green. These color filters 120 are preferably mounted in the front end of the machine, so that they are in front of the respective lens-parts 23 and 24; and they are carried by lateral supporting arms 121, passing through openings in the side of the frame 10 and adjustable transversely of the frame to desired position, in which they may be clamped by clamping screws 122. By adjusting the color filters so that they are made to overlap laterally different proportionate parts of the lens-parts, to permit part of the light from each lens-part to pass to the screen without passing through the color filter while requiring the remainder of the light to pass through the color filter, any desired color effect on the screen may be readily and accurately obtained.

In operation, the film 25 to be shown travels from a supporting reel above to a rewinding reel below the machine, over the various film sprockets and guide rollers and through the film gate 29, being associated with these parts or dissociated therefrom by lifting up the swinging arm 55 as has already been explained. The film travels through the machine at a uniform speed, and the pictures are displayed on the screen without any intermittency of movement of the film. The light from any usual source 110 is transmitted through the usual condensing lens 111, so that it is concentrated on the opening in the film gate 29 and on the pictures at any moment passing through such film gate. The width of this film gate is the width of a film picture, as is customary; but the height of the film gate is more than twice the height of a single picture, and with the arrangement shown is substantially two and one-half (2½) times the height of a single picture. As each picture gets fully into the film gate at the upper portion thereof, it comes into registry with one light-confining tube 18 and with one of the lens-parts 23 or 24; and this picture and its light-confining tube and lens-part all move downward together and at proportionate speeds so that the projected picture on the screen is substantially without movement, the lens-part if desired moving very slightly more slowly than does the picture to insure this for fine projection. As each picture reaches the bottom of the film gate, the light through it is shut off from the screen by one set of plates 98, and then the lens-part with which it was co-operating is moved upward again into position for co-operative relation with another film picture. Only during the middle third of the period it is being shown is any picture on the film by itself, as during the first third of such period there is also on the screen the preceding picture, transmitted through the other lens-part, and during the last third of such period there is also on the screen the succeeding picture, also transmitted through the other lens-part, such other lens-part having changed its co-operative relation from the preceding picture to the succeeding picture during the aforesaid middle third. If the pictures are not framed properly, the framing may be adjusted by manipulating the framing lever 43; and if successive pictures do not register properly, they may be made to register properly by the adjustment of the screw 87. Both of these adjustments may be made while the film is in motion.

I claim as my invention:—

1. In a moving-picture machine, the combination of means for moving a film at a uniform rate, an objective lens divided longitudinally into a plurality of parts, and means for moving said lens-parts separately in the direction of film movement at substantially uniformly distributed points in a common time-cycle and at a speed substantially proportional to that of the film and for returning them at a more rapid rate so that each lens-part is moved in the direction of film movement for more than half of its own time-cycle of movement and one lens-part starts to move in the direction of film movement before another lens-part has completed its movement in that direction.

2. In a moving-picture machine, the combination of means for moving a film, an objective lens divided longitudinally into a plurality of parts, and means for moving said lens-parts separately in the direction of film movement at substantially uniformly distributed points in a common time-cycle at a speed substantially proportional to that of the film and for returning them at a more rapid rate so that each lens-part is moved in the direction of film movement for more than half of its own time-cycle of movement and one lens-part starts to move in the direction of film movement before another lens-part has completed its movement in that direction.

3. In a moving-picture machine, the combination of means for moving a film at a uniform rate, an objective lens divided longitudinally into a plurality of parts, and means for moving said lens-parts separately in the direction of film movement at substantially uniformly distributed points in a common time-cycle at a speed substantially proportional to that of the film and for returning them at such a rate that one lens-part will start to move in the direction of film movement before another lens-part has completed its movement in that direction.

4. In a moving-picture machine, the combination of means for moving a film, an objective lens divided longitudinally into a plurality of parts, and means for moving said lens-parts separately in the direction of film movement at substantially uniformly distributed points in a common time-cycle at a speed substantially proportional to that of the film and for returning them at such a rate that one lens-part will start to move in the direction of film movement before another lens-part has completed its movement in that direction.

5. In a moving-picture machine, the combination of means for moving a film at a uniform rate, an objective lens divided longitudinally into a plurality of parts, means for moving said lens-parts separately in the direction of film movement and for returning them, and movable light-confining tubes for confining the light transmitted through each lens-part to that for one picture of the film.

6. In a moving-picture machine, the combination of means for moving a film, an objective lens divided longitudinally into a plurality of parts, means for moving said lens-parts separately in the direction of film movement and for returning them, and movable light-confining tubes for confining the light transmitted through each lens-part to that for one picture of the film.

7. In a moving-picture machine, the combination of means for moving a film at a uniform rate, an objective lens divided longitudinally into a plurality of parts, means for moving said lens-parts separately in the direction of film movement and for returning them, and movable light-confining tubes for confining the light transmitted through each lens-part to that for one picture of the film, said light-confining tubes being located in a plane between the film and the objective lens, and each light-confining tube conforming at its lens end and at its film end substantially to the shape of its associated lens-part and to the shape of a picture of the film respectively.

8. In a moving-picture machine, the combination of means for moving a film, an objective lens divided longitudinally into a plurality of parts, means for moving said lens-parts separately in the direction of film movement and for returning them, and movable light-confining tubes for confining the light transmitted through each lens-part to that for one picture of the film, said light-confining tubes being located in a plane between the film and the objective lens, and each light-confining tube conforming at its lens end and at its film end substantially to the shape of its associated lens-part and to the shape of a picture of the film respectively.

9. In a moving-picture machine, the combination of means for moving a film at a uniform rate, an objective lens divided longitudinally into a plurality of parts, means for moving said lens-parts separately in the direction of film movement and for returning them, and movable light-confining tubes for confining the light transmitted through each lens-part to that for one picture of the film, said light-confining tubes being arranged in an endless series moving continuously unidirectionally.

10. In a moving-picture machine, the combination of means for moving a film, an objective lens divided longitudinally into a plurality of parts, means for moving said lens-parts separately in the direction of film movement and for returning them, and movable light-confining tubes for confining the light transmitted through each lens-part to that for one picture of the film, said light-confining tubes being arranged in an endless series moving continuously unidirectionally.

11. In a moving-picture machine, the combination of means for moving a film at a uniform rate, an objective lens divided longitudinally into a plurality of parts, means for moving said lens-parts separately in the direction of film movement, and for returning them, and movable light-confining tubes for confining the light transmitted through each lens-part to that for one picture of the film, said light-confining tubes being mounted on a wheel rotatable uni-directionally.

12. In a moving-picture machine, the combination of means for moving a film, an objective lens divided longitudinally into a plurality of parts, means for moving said lens-parts separately in the direction of film movement, and for returning them, and movable light-confining tubes for confining the light transmitted through each lens-part to that for one picture of the film, said light-confining tubes being mounted on a wheel rotatable uni-directionally.

13. In a moving-picture machine, the combination of means for moving a film, an objective lens divided longitudinally into a plurality of parts, means for moving said lens-parts separately in the direction of film movement and for returning them, and movable light-confining tubes for confining the light transmitted through each lens-part to that for one picture of the film, said light-confining tubes being arranged in an endless series moving continuously uni-directionally, the light-confining tubes in said series being arranged in groups corresponding in number to the number of parts in which the lens is divided, said light-confining tubes having their ends near the film in one continuous series so that they will register successively with the various pictures of the film and having their ends toward the objective lens arranged in a staggered relation so that such ends of the various tubes of any group will substantially register with the respective lens-parts during the movement of the latter in the direction of film movement.

14. In a moving-picture machine, the combination of means for moving a film, an objective lens divided longitudinally into a plurality of parts, means for moving said lens-parts separately in the direction of film movement and for returning them, and movable light-confining tubes for confining the light transmitted through each lens-part to that for one picture of the film, said light-confining tubes being mounted on a wheel rotatably uni-directionally, the light-confining tubes on said wheel being arranged in groups correspondingly in number to the number of parts in which the lens is divided, said light-confining tubes having their ends near the film in one continuous series so that they will register successively with the various pictures of the film and having their ends toward the objective lens arranged in a staggered relation so that such ends of the various tubes of any group will substantially register with the respective lens-parts during the movement of the latter in the direction of film movement.

15. In a moving-picture machine, the combination of means for moving a film at a uniform rate, an objective lens divided longitudinally into a plurality of parts, means for moving said lens-parts separately in the direction of film movement and for returning them, and differently colored light-filters each co-operating with one of said lens-parts, said light-filters being adjustable so that they may cover different proportionate parts of their respective associated lens-parts.

16. In a moving-picture machine, the combination of means for moving a film, an objective lens divided longitudinally into a plurality of parts, means for moving said lens-parts separately in the direction of film movement and for returning them, and differently colored light-filters each co-operating with one of said lens-parts, said light-filters being adjustable so that they may cover different proportionate parts of their respective associated lens-parts.

17. In a moving-picture machine, the combination of a main frame, a supporting part carried by and movable relatively to said frame, a film-gate having front and rear parts one of which is mounted on said frame and one on said supporting part so that said two parts are separated by the movement of said supporting part, and film sprockets of which at least some are carried by said supporting part.

18. In a moving-picture machine, the combination of a main frame, a supporting part movable relatively to said frame, and a film-gate having front and rear parts one of which is mounted on said frame and one on said supporting part so that said two parts are separated by the movement of said supporting part, one or more film sprockets, one or more spring-pressed rollers co-operating with said film sprockets to hold the film in proper co-operation therewith, and means for releasing the pressure of said rollers by the movement of said supporting part to separate the two parts of the film-gate.

19. In a moving-picture machine, the combination of a main frame, a supporting part movable relatively to said frame, and a film-gate having front and rear parts one of which is mounted on said frame and one on said supporting part so that said two parts are separated by the movement of said supporting part, one or more film sprockets, one or more members co-operating with the respective film sprockets for holding the film in proper co-operation therewith, and means for causing said holding members to be separated from said film-sprockets by the movement of said supporting part to separate the two parts of the film-gate.

20. In a moving-picture machine, the combination of a main frame carrying an objective lens, a sub-frame carrying a film gate and film-moving parts, and means for adjusting said sub-frame and its carried parts on the main frame for focusing the machine.

21. In a moving-picture machine, the combination of a main frame carrying an objective lens, a sub-frame carrying a film gate and film-moving parts, and means for adjusting said sub-frame and its carried parts on the main frame for focusing the machine, a driving shaft on the main frame, intermediate gearing between said driving shaft and said film-moving parts, said intermediate gearing including relatively movable members which permit the relative movement of the sub-frame on the main frame while maintaining the framing of the pictures of the film in the film gate.

22. In a moving-picture machine, the combination of a main frame carrying an objective lens, a sub-frame carrying a film gate and film-moving parts, and means for adjusting said sub-frame and its carried parts on the main frame for focusing the machine, a driving shaft on the main frame, intermediate gearing between said driving shaft and said film-moving parts, said intermediate gearing including relatively movable members which permit the relative movement of the sub-frame on the main frame while maintaining the framing of the pictures of the film in the film gate, said intermediate gearing including two intermeshing spiral gears on axes transverse to each other, one of said spiral gears being adjusable axially of itself relatively to the other to frame the picture.

23. In a moving-picture machine, the combination of a main frame carrying an objective lens, a sub-frame carrying a film gate and film-moving parts, and means for adjusting said sub-frame and its carried parts on the main frame for focusing the machine, a driving shaft on the main frame, intermediate gearing between said driving shaft and said film-moving parts, said intermediate gearing including relatively movable members which permit the relative movement of the sub-frame on the main frame while maintaining the framing of the pictures of the film in the film gate, said intermediate gearing including two intermeshing spiral gears, one of said spiral gears being adjustable axially of itself relatively to the other to frame the picture.

In witness whereof, I have hereunto set my hand at Indianapolis, Indiana, this 25th day of October, A. D. one thousand nine hundred and twenty two.

ELWOOD C. ROGERS.